United States Patent
Uhtenwoldt et al.

[15] 3,643,382
[45] Feb. 22, 1972

[54] GRINDING MACHINE

[72] Inventors: Herbert R. Uhtenwoldt, Worcester; William H. Grotewold, Holden; Norman S. Humes, Worcester, all of Mass.

[73] Assignee: The Heald Machine Company, Worcester, Mass.

[22] Filed: Jan. 8, 1970

[21] Appl. No.: 1,378

[52] U.S. Cl. ................................. 51/103 WH, 51/215 H
[51] Int. Cl. ........................................................ B24b 5/18
[58] Field of Search ........ 51/103 R, 103 WH, 215 R, 215 CP, 51/215 H, 215 EU, 48 R

[56] References Cited

UNITED STATES PATENTS

| | | |
|---|---|---|
| 1,791,713 | 2/1931 | Caster et al. ................. 51/103 WH |
| 1,902,164 | 3/1933 | Haegg ......................... 51/215 H UX |
| 1,976,110 | 10/1934 | Binns ................................. 51/103 R |
| 2,027,627 | 1/1936 | Blood et al. ............. 51/103 WH UX |
| 2,050,482 | 8/1936 | Blood et al. ............. 51/103 WH UX |
| 3,226,886 | 1/1966 | Seidel ............................... 51/215 R |

*Primary Examiner*—Lester M. Swingle
*Attorney*—Norman S. Blodgett

[57] ABSTRACT

This invention relates to a grinding machine and, more particularly, to apparatus for grinding large workpieces including a regulating roll having visco-elastic material contained in it and having a loading arm particularly adapted for use with a curved ramp for conveying the workpiece to and from the work area.

6 Claims, 4 Drawing Figures

INVENTORS
HERBERT R. UHTENWOLDT
WILLIAM H. GROTEWOLD
NORMAN S. HUMES
BY
ATTORNEY

GRINDING MACHINE

BACKGROUND OF THE INVENTION

In the grinding of large workpieces, there are many problems that arise simply from the fact that the workpieces are so massive. The large size of the supporting area of the workpieces during grinding, for instance, can introduce large errors into the grinding operation, because the surface is so large that even small errors in the supporting surface produce large errors in the finished ground surface. Large workpieces are more susceptible to low-frequency vibration because of their lower natural frequency and the lower natural frequencies of any systems in which they are supported. Furthermore, they represent the considerable weight and, for that reason, present other problems one of which, for instance, is that of moving them in and out of the work area. If they are not completely supported at all times during the loading operation, any amount of fall or free movement can produce shocks in the machine which can upset the delicately adjusted settings of the machine. When some of the parts are to be moved rather rapidly, as in the case of an oscillating workhead in internal grinding, it is necessary to mount on the fixed base the loading and discharge chutes which contain large numbers of the workpieces independently of the movable element. Otherwise, the mass of the stored workpieces would present workhead movement problems that are practically insurmountable. When, however, such storage chutes are mounted independently of the moving means, causing them to pass from the chutes to the work area of the workhead without shock is difficult, particularly when different sizes of workpieces are used from time to time. These and other difficulties experienced with the prior art devices have been obviated in a novel manner by the present invention.

It is, therefore, an outstanding object of the invention to provide a grinding machine having a regulating roll which serves to dampen vibrations in the workpiece and in the machine.

Another object of this invention is the provision of apparatus for grinding having a loading means for large workpieces operative in such a way that the workpiece is never allowed to drop or stop suddenly.

A further object of the present invention is the provision of a grinding machine permitting the storage of large numbers of large workpieces in an incoming and outgoing chute without adding the storage mass to the movable parts of the machine.

With these and other objects in view, as will be apparent to those skilled in the art, the invention resides in the combination of parts set forth in the specification and covered by the claims appended hereto.

SUMMARY OF THE INVENTION

In general, the invention consists of a grinding machine having a base on which are mounted a workhead and wheelhead and having a regulating wheel formed in part of a viscoelastic material adapted to engage a surface of revolution of a workpiece for locating and driving the same, the material serving to dampen vibrations in the workpiece.

More specifically, the regulating wheel has a central cylindrical portion surrounded by a layer of the viscoelastic material and spaced annular metal rings are embedded in the material to provide aligned cylindrical surfaces for engagement with the workpiece, the rings moving to compensate for irregularities in the surface of the workpiece. A curved ramp extends away from a location where the workpiece is supported and rotated and the loading arm is swingable about an axis parallel to the surface of the ramp to push a workpiece across the ramp.

BRIEF DESCRIPTION OF THE DRAWINGS

The character of the invention, however, may be best understood by reference to one of its structural forms, as illustrated by the accompanying drawings, in which.

OF THE PREFERRED EMBODIMENT

Figure 1:
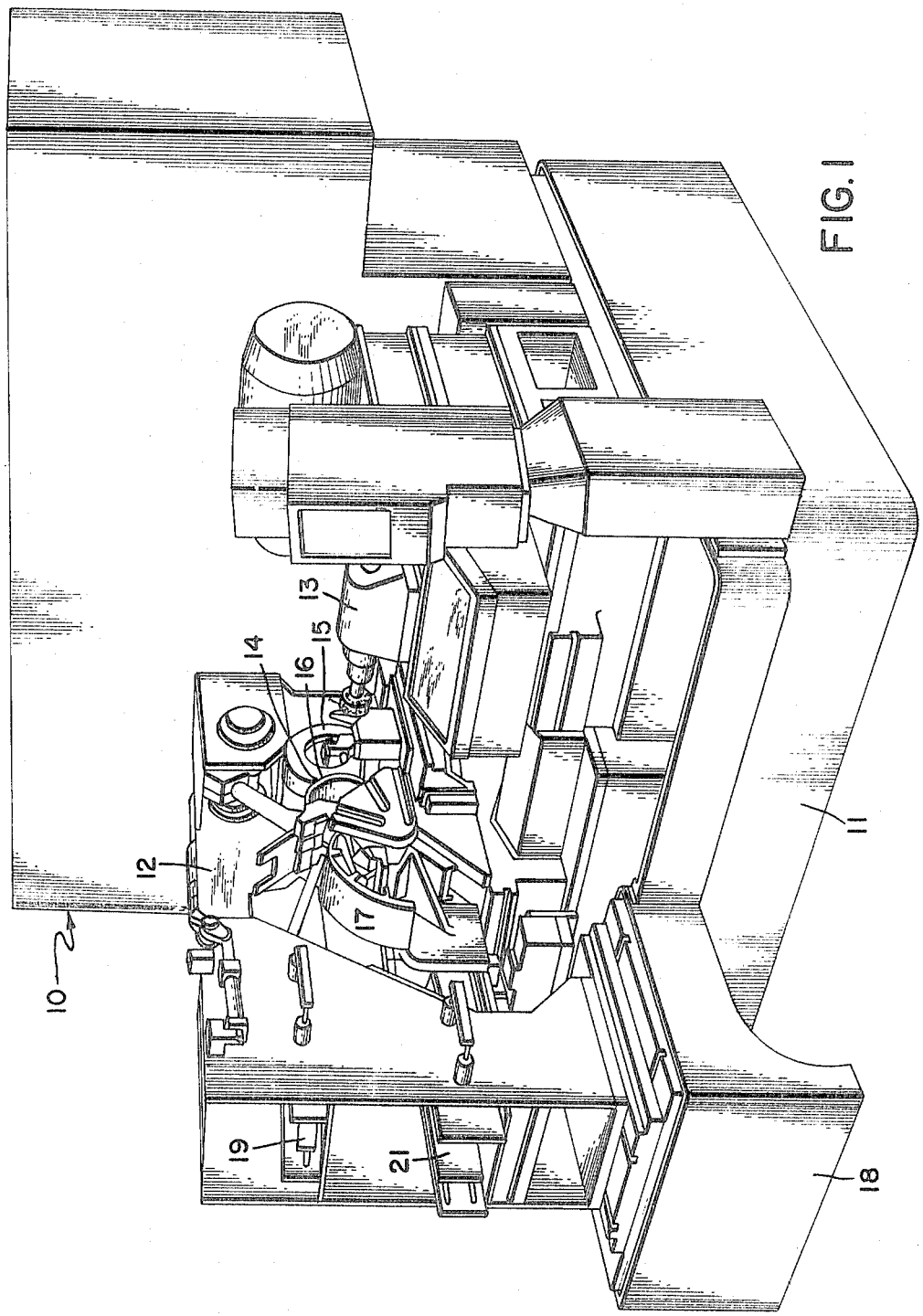
FIG. 1 is a perspective view of a grinding machine embodying the principles of the present invention.

Referring first to FIG. 1, wherein are best shown the general features of the invention, the grinding machine, indicated generally by the reference numeral 10, is indicated as being of the type described in the patent of Hohler et al. No. 3,197,921 which issued on Aug. 3, 1965. The machine is provided with a base 11 on which is mounted a workhead 12 and a wheelhead 13. The workhead is mounted in the usual way for longitudinal motion parallel to the axis of a workpiece 14, while the wheelhead 13 is mounted for transverse movement. The machine is provided with a regulating wheel 15 which is formed at least in part of a viscoelastic material. The roll or regulating wheel is adapted to engage an outside surface of revolution 16 of the workpiece for locating and driving it, the material serving to dampen vibrations therein. Associated with the regulating wheel is a loading mechanism 17 mounted on and movable with the workhead. Extending forwardly from the base 11 is an extension 18 whose upper surface carries an upper loading chute 19 and a lower discharge chute 21.

Figure 2:
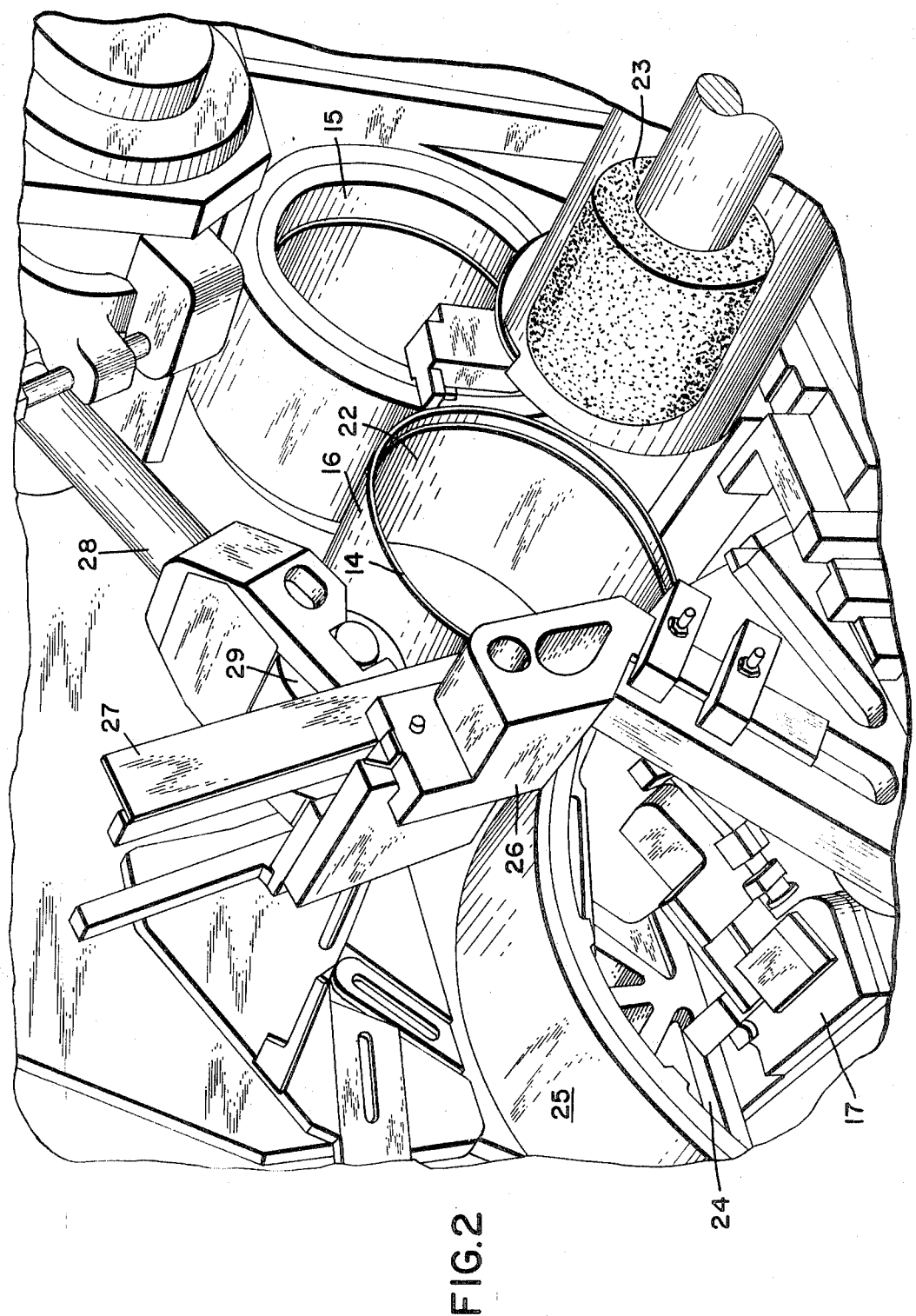
FIG. 2 is a perspective view somewhat enlarged of the work portion of the grinding machine.

Referring now to FIG. 2, it can be seen that the workpiece 14 is engaged on its O.D. surface 16 by the regulating wheel 15 and has an I.D. surface 22 which is to be finished by an abrasive wheel 23 mounted as a cantilever on the wheelhead 13. The loading mechanism 17 is shown as having a fixed ramp 24 with a cylindrical surface 25 with which is associated a loading arm 26 pivoted about the axis of the surface 25 and provided with a track 27. Also mounted on the workhead 12 is an arm 28 having at its outer end a pressure roll 29 adapted to engage and press the outer surface 16 of the workpiece.

Figure 3:
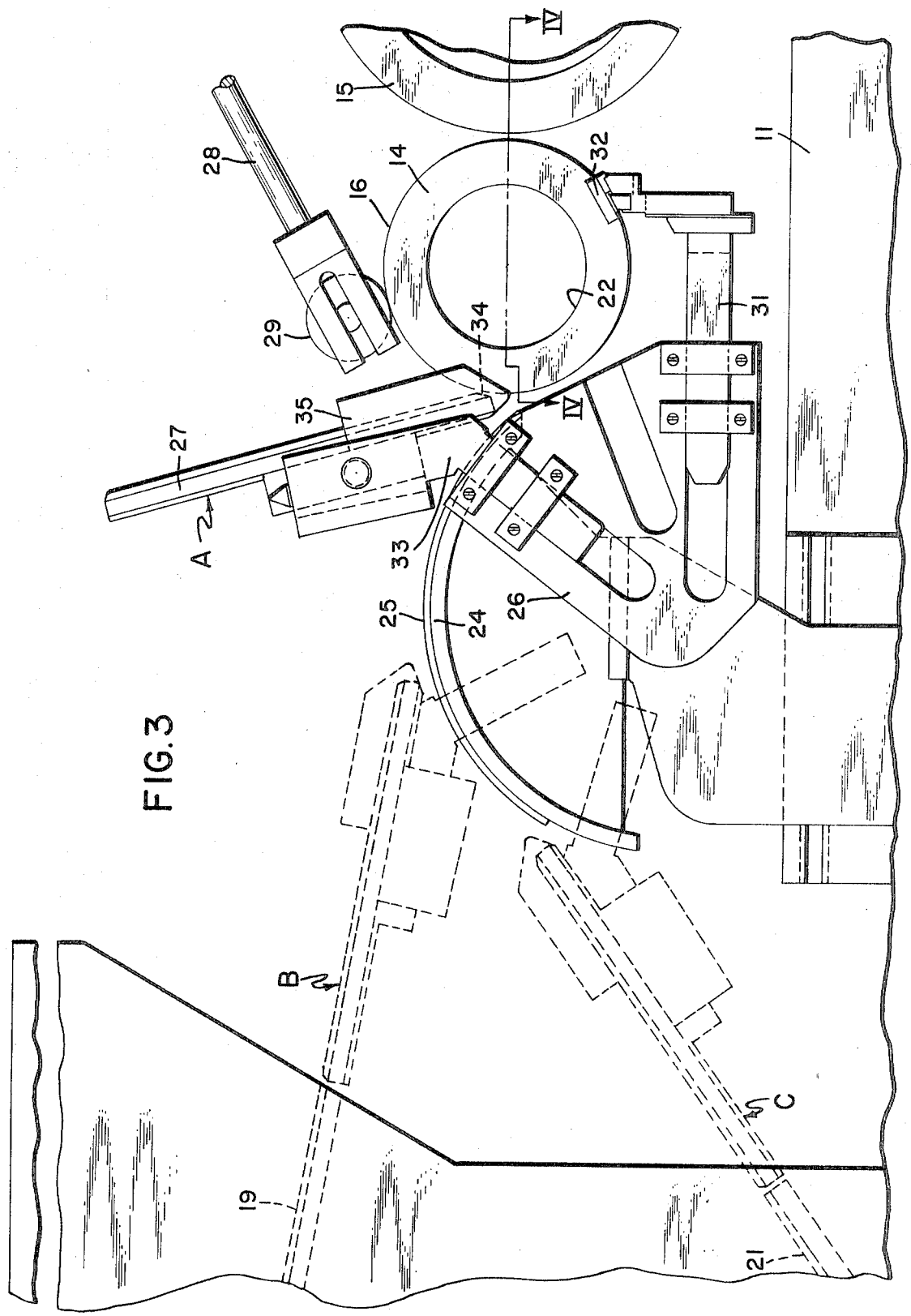
FIG. 3 is a transverse view of the machine showing the loading and regulating apparatus.

In FIG. 3 it can be seen that the loading arm 26 has a branch 31 which carries a shoe 32 engageable with the O.D. of the workpiece. The other branch 33 which carries the track 27 also has a shoe 34 defined by an inclined surface at the end of the track 27 and which lies adjacent the outside diameter 16 of the workpiece with flanges 35 extending on either side of the workpiece to hold it against linear movement. This view shows particularly well the three positions of the loading arm 26. A position A is where the workpiece is being worked on and the shoe 34 lies adjacent the outer surface; the shoe 32 lies under the workpiece with the arm 28 in the down position and the roller 29 presses against the workpiece as does the regulating wheel 15. The position B is when the arm is in an intermediate position and the track 27 constitutes an extension of the loading chute 19; it extends tangentially to the cylindrical surface 25 of the ramp 24. Finally, the position C is the position in which the track constitutes a bridge from the ramp 24 to the discharge chute 21.

Figure 4:
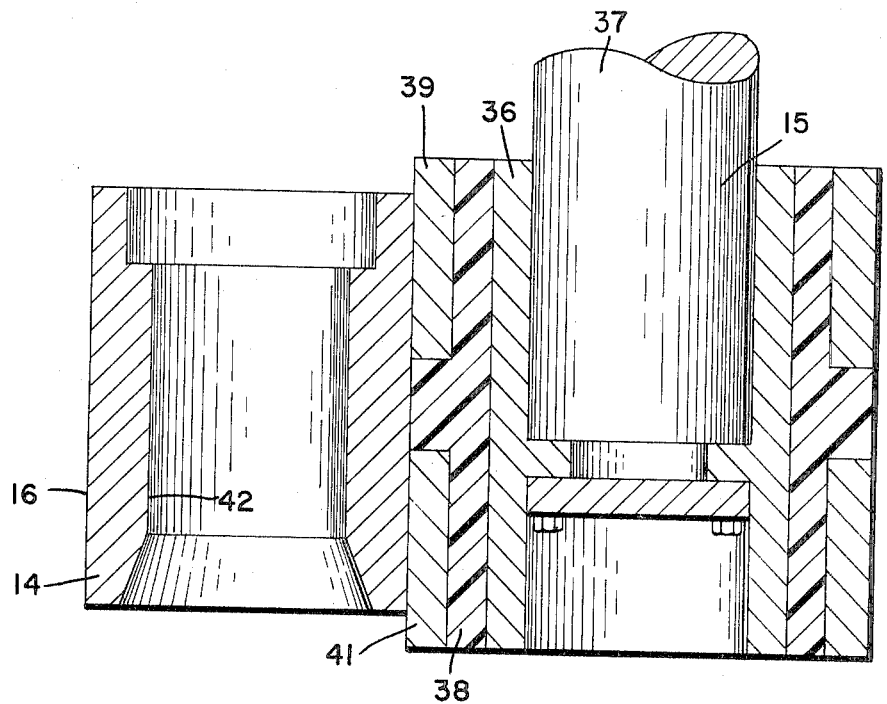
FIG. 4 is a sectional view of a portion of the machine taken on the line IV—IV of FIG. 3.

FIG. 4 shows the details of construction of the regulating roll 15. It is provided with a central metal rotor 36 bolted on the end of a shaft 37 which is driven by the workhead motor (not shown). Extending around the rotor is a layer 38 of a viscoelastic material, such as rubber, in which are embedded two steel rings 39 and 41. These rings engage the outer cylindrical surface 16 of the workpiece 14 and adjust themselves for irregularities (such as taper) in the surface 16 relative to the axis of the inner surface 42 which is to be finished.

The operation of the apparatus will now be readily understood in view of the above description. With the workpiece 14 in place in the manner shown in FIG. 1, the workpiece 14 is rotated in the usual way by the regulating roll or wheel 15. The workhead 12 moves in a grinding cycle longitudinally of the workpiece, while the wheelhead 13 moves laterally in a crossfeed motion in the well-known manner. When the workpiece has been ground to size, the arm 28 is rotated to move the pressure roll 29 out of the work area. Then, the loading arm 26 is rotated in a counterclockwise manner (as observed in FIG. 3), the shoe 32 lifting the workpiece and carrying it up on to the surface 25 of the ramp 24. It rolls over the ramp and is prevented from going too fast by engagement with the shoe 34 at the inner end of the track 27. The loading arm moves through the position B into the position C and the workpiece rolls off the ramp over the track 27 onto the discharge chute 21. The loading arm is then moved in a clockwise direction again into position B where, in the usual way, a workpiece is released from the loading chute 19 and rolls across the track 27 onto the ramp 25. Then, the loading arm is further rotated from the position B to the position A carrying the workpiece into the work area where it can be engaged by the regulating wheel 15. The arm 28 and its pressure roll 29 are then moved into place for the next grinding operation.

As is evident from an examination of FIG. 4, the rings 39 and 41 on the regulating wheel 15 automatically adjust themselves for irregularities in the O.D. surface 16 of the workpiece. This is particularly true when unwanted taper is present and the rings are allowed to move out of alignment with the axis of the workpiece in order to produce a complete contact with the surface which they guide and drive. The viscoelastic material in the roll has a strong tendency to dampen any vibrations which may arise in the system during grinding, either due to irregularities in the outer surface of the workpiece or to an out-of-round condition on the surface to be finished.

It can be seen that the loading apparatus operates to carry the workpieces from their storage chutes to the work area and out to the storage chute for discharge without the heavy workpieces falling or being suddenly stopped. It is possible easily to make adjustments in the branch 31 of the loading apparatus and in the work track 27 as well as the branch 33 during a changeover to a different size of workpiece. Provision is made for adjusting the entire support for the loading chute and the discharge chute along the top of the base extension 18, when larger workpieces are used. At that time, it is possible to adjust the track 27 so that it acts as a complete bridge between the chutes and the ramp 24. The oscillating movements of the wheelhead 12 readily take place because the loading chute 19 and the discharge chute 21 (which contain heavy masses of workpieces and whose weight changes because of a number of workpieces in a chute at a given time may vary) are not mounted on the workhead but on a separate portion of the base.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine, comprising
   a. a base
   b. a workhead and a wheelhead mounted on the base, and
   c. a regulating wheel also mounted on the base and formed in large part as a massive metal wheel, in part of a relatively thin layer of a viscoelastic material, and in part of hard, wear-resistant elements embedded in the material to engage a surface of revolution of a workpiece for locating and driving the same, the material serving to dampen vibrations in the workpiece.

2. A grinding machine as set forth in claim 1, wherein the regulating wheel has a central cylindrical portion surrounded by the layer of the viscoelastic material and wherein the elements are spaced annular metal rings embedded in the material to provide aligned cylindrical surfaces for engagement with the workpiece, the rings moving to compensate for irregularities in the surface of the workpiece.

3. A grinding machine as recited in claim 1, wherein the workhead includes a curved ramp extending away from a location where the workpiece is supported and rotated, and wherein a loading arm is swingable about an axis parallel to the surface of the ramp to push a workpiece across the ramp.

4. A grinding machine as recited in claim 3, wherein the ramp has a convex cylindrical surface generally tangential to the said surface of revolution of the workpiece when it is in the said location, and wherein the loading arm is provided on one side with a shoe for engagement with the workpiece when the arm is at one end of its swing and on the other side with a track which extends from the ramp to a storage chute for workpieces when the arm is in another position.

5. A grinding machine as recited in claim 4, wherein the arm is movable to a third position where the track acts as a path leading from the ramp to a discharge chute.

6. A grinding machine as recited in claim 5, wherein the workhead is movable axially of the workpiece to move it toward and away from an abrasive wheel mounted on the wheelhead, and wherein the storage chute and the discharge chute are mounted on the base independently of the workhead, the said track acting on occasion as a bridge from the storage chute to the ramp or from the ramp to the discharge chute.

* * * * *